3,496,227
TRICYCLIC AMINES

Berthold Richard Vogt, King of Prussia, Pa., assignor to Smith Kline & French Laboratories, Philadelphia, Pa., a corporation of Pennsylvania
No Drawing. Filed Sept. 18, 1967, Ser. No. 668,633
Int. Cl. C07c 87/40, 61/12
U.S. Cl. 260—514          8 Claims

ABSTRACT OF THE DISCLOSURE

Tricyclo[4.3.1.0$^{3,8}$]decanes, substituted at the 3-position with an amino, aminomethyl, or α-aminoethyl group, and tricyclo[4.3.0.0$^{3,8}$]nonanes, similarly substituted, are prepared by a sequence of reactions from dimethyl 2,6-dioxobicyclo[3.3.1]heptane-3,7-dicarboxylate. The products are anti-influenza agents.

---

This invention relates to antiviral tricyclic hydrocarbons substituted with an amino or aminomethyl group. In particular the invention relates to tricyclo[4.3.1.0$^{3,8}$]-decanes and tricyclo[4.3.0.0$^{3,8}$]nonanes.

The compounds of the invention are characterized by the following structural formulas:

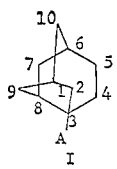 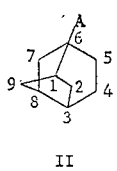

wherein A is amino, aminomethyl, or α-aminoethyl.

Also considered part of the invention are the pharmaceutically acceptable acid addition salts of the compounds of Formulas I and II.

The compounds of the invention are prepared by synthetic routes schematically outlined below.

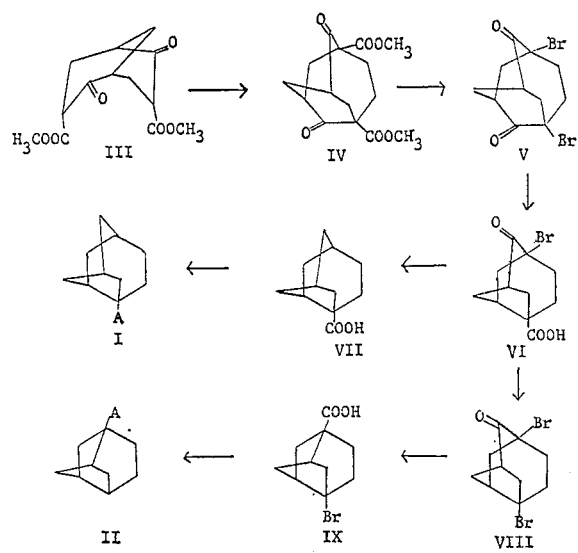

Dimethyl 2,6 - dioxobicyclo[3.3.1]heptane - 3,7 - dicarboxylate (III) is condensed with 1,2-dibromoethane in the presence of a base such as sodium hydride in a solvent such as ethylene glycol dimethyl ether. The resulting tricyclic diketo diester IV is then hydrolyzed with acid to the dicarboxylic acid, which is then converted to the corresponding dibromo compound V by means of the Hunsdiecker reaction. This compound is then partially ring-contracted by the Favorskii rearrangement to give the bromo keto acid VI. Zinc amalgam in hydrochloric acid by reductive debromination gives the 3-carboxylic acid, which is the key intermediate for preparing the various compounds of Formula I. By subjecting this acid to the Curtius reaction, or alternatively the Schmidt reaction, 3-aminotricyclo[4.3.1.0$^{3,8}$]decane is obtained. Reduction of the amide obtained from the carboxylic acid via the acid chloride with a reagent such as lithium aluminum hydride gives the 3-methylamine. Reaction of the carboxylic acid chloride with dimethyl cadmium gives the tricyclodecyl methyl ketone which is converted to its oxime and then reduced to give the α-methylmethylamine.

When the bromo keto acid VI, instead of being treated with zinc amalgam and acid, is subjected to a Hunsdiecker reaction, the dibromo ketone VIII is obtained. Favorskii rearrangement gives the bromo acid IX. Debromination with lithium in t-butanol gives the tricyclononanecarboxylic acid which is then treated as above to give the amine methylamine, or α-methylmethylamine.

The basic amine compounds are converted to their pharmaceutically acceptable acid addition salts by procedures well-known to the art, for example, by combining them with the particular acid, either or both compounds preferably being in an alcoholic or ethereal solution.

The compounds of the invention are antiviral agents, being active against influenza infections. The preferred compound, 3-aminotricyclo[4.3.1.0$^{3,8}$]decane, significantly increased the survival of mice infected with influenza A$_2$, Ann Arbor strain, at an oral dose of 6.25 mg./kg. The compounds are administered orally, intranasally, or parenterally. They are formulated for use as tablets, capsules, syrups, nasal sprays, or injectables by combining them with standard pharmaceutical excipients according to conventional practice.

It will be apparent to those skilled in the art of medicinal chemistry that certain obvious variants can be made in compounds and processes of the invention without departing from the spirit thereof. Such variants, being within the province of normal skill, are considered part of the present invention.

The following examples are not intended to limit the scope of the invention, but are only illustrative. Temperatures stated are in degrees centigrade.

EXAMPLE 1

3-aminotricyclo[4.3.1.0$^{3,8}$]decane

Tricyclo[4.3.1.0$^{3,8}$]decane-3-carboxylic acid (1.6 g.) is refluxed for 3 hours with 2.3 g. of SOCl$_2$ and a drop of pyridine in 50 ml. of ether. The solvent is evaporated, benzene being added to aid in removal of traces of SOCl$_2$, and to the residual oil dissolved in cold (3°) acetone (68 ml.) is added with stirring a solution of 0.66 g. of NaN$_3$ in 6.6 ml. of water. Stirring is continued for 10 minutes at 3° and then for 15 minutes at room temperature. Ice water (150 ml.) is added and the solution extracted with benzene. The benzene extracts are washed, dried, and concentrated to ca. 10 ml., and 100 ml. of dry benzene added. The solution of the azide is then refluxed for 4 hours under a Dean-Stark trap, the solvent is removed, and the residual isocyanate refluxed for 1½ hours in 30 ml. of acetone with 7.5 ml. of conc. HCl. The mixture is cooled, diluted with water, washed with ether, made alkaline with 25% aqueous NaOH, and extracted with ether. These ether extracts are washed, dried, and evaporated to give the title product which is purified by distillation.

To a solution of this amine in a small volume of ether is added excess ethereal HCl. The precipitated hydrochloride is filtered off, dried, and recrystallized from ether-methanol; M.P. >370°.

EXAMPLE 2

6-aminotricyclo[4.3.0.0$^{3,8}$]nonane

Tricyclo[4.3.0.0$^{3,8}$]nonane-6-carboxylic acid is treated with SOCl$_2$ to obtain the acid chloride, this compound converted to the azide with NaN$_3$, the azide converted to the isocyanate by refluxing in benzene, and the isocyanate converted to the amine by refluxing with HCl, all according to the same procedure and using the same relative quantities as in Example 1.

EXAMPLE 3

α-Methyltricyclo[4.3.1.0$^{3,8}$]decane-3-methylamine

Tricyclo[4.3.1.0$^{3,8}$]decane-3-carboxylic acid (17.4 g.) is refluxed for 3 hours with 23 g. of SOCl$_2$ and a few drops of pyridine in 500 ml. of ether. The solvent is evaporated in vacuo, benzene being added to aid in removing traces of SOCl$_2$.

A solution of the resulting acid chloride in 60 ml. of dry benzene is added slowly to a stirred suspension of 18 g. of dimethyl cadmium in 200 ml. of dry benzene, and the reaction gently refluxed for 2 hours. The mixture is cooled, poured onto ice, and acidified with 3 N HCl. The benzene is separated, the aqueous phase washed with benzene, and the combined benzene extracts washed, dried, and evaporated to give methyl tricyclo[4.3.1.0$^{3,8}$]-dec-2-yl ketone, purified by vacuum distillation.

The ketone (16.3 g.) is refluxed for 3 hours with 6.9 g. of hydroxylamine hydrochloride and 4.4 g. of NaHCO$_3$ in 100 ml. of dry methanol. The suspension is cooled, diluted with water, and extracted with ether. The ether extracts are washed with a saturated aqueous NaCl solution, dried, and evaporated to give the oxime.

To a solution of 3.0 g. of the oxime in 100 ml. of ethanol and 100 ml. of 2 N aqueous NaOH is added 4.5 g. of Raney Ni. Stirring is continued for 1 hours and the suspension is filtered. The filtrate is diluted with saturated NaCl solution and extracted with ether. The ether extracts are washed, dried, and evaporated to give the title product, purified by vacuum distillation.

The hydrochloride salt is prepared in the customary manner as described in Example 1.

α - Methyltricyclo[4.3.0.0$^{3,8}$]nonane-6-methylamine is prepared from tricyclo[4.3.0.0$^{3,8}$]nonane - 6 - carboxylic acid by utilizing the above procedure.

EXAMPLE 4

Tricyclo[4.3.1.0$^{3,8}$]decane-3-methylamine

The acid chloride is prepared from tricyclo[4.3.1.0$^{3,8}$]decane-3-carboxylic acid as described in Example 3. A solution of 6.1 g. of this acid chloride in 15 ml. of dry tetrahydrofuran is added dropwise over 2–3 minutes to an ice-cold solution of 75 ml. of conc. NH$_4$OH. The mixture is stirred for 1 hour, water is added, and the amide filtered off and recrystallized.

To a slurry of 3.04 g. of LiAlH$_4$ in 400 ml. of boiling tetrahydrofuran is added portionwise over 1 hour 3.7 g. of the above amide, all under nitrogen. The mixture is refluxed for 48 hours, cooled, and aqueous Na$_2$SO$_4$ cautiously added to decompose the excess LiAlH$_4$. The resulting slurry is filtered, and filter cake washed well with ether, and the combined filtrates evaporated to give the title product, which is purified by distillation.

The hydrochloride or other salt is prepared in the customary manner.

Tricyclo[4.3.0.0$^{3,8}$]nonane-6-methylamine is prepared from the corresponding 6-carboxylic acid in the same manner.

PROCEDURE 1

Tricyclo[4.3.1.0$^{3,8}$]decane-3-carboxylic acid

To a cooled, stirred suspension of 10.6 g. of NaH in 150 ml. of dryethylene glycol dimethyl ether is added, portionwise under nitrogen, 40.0 g. of dimethyl 2,6-dioxo - bicyclo[3.3.1]heptane-3,7-dicarboxylate [Ber. 74, 1644 (1941)]. When hydrogen evolution has ceased, 40 ml. of solvent is distilled off under a vacuum of ca. 30 mm. Hg. Dry 1,2-dibromoethane (110 ml.) is added and 70 ml. more solvent distilled off. Additional 1,2-dibromoethane (70 ml.) is added and the suspension stirred at 120° for 22 hours under nitrogen. The mixture is cooled, 450 ml. of pentane added, and the resulting precipitate filtered off, washed, with pentane, and dried. This material is then stirred with 700 ml. of water after 3 N HCl is added to bring the suspension to pH 7. The precipitate is filtered off, dried, and chromatographed on neutral alumina (activity I). The product, dimethyl 10,11-dioxotricyclo[4.3.1.1$^{4,8}$]undecane-1,4-dicarboxylate (IV), is recrystallized from acetonitrile and melts at 195–197°.

This diketo diester (60.1 g.) is refluxed with 290 ml. of conc. HCl and 580 ml. of glacial acetic acid for 1½ hours with stirring. The mixture is then concentrated in vacuo to a volume of ca. 500 ml. The mixture is cooled, and the product diketo dicarboxylic acid filtered off, dried, and recrystallized from acetonitrile; M.P. 290–292°.

The diketo diacid (50.9 g.) is suspended in 330 ml. of water and converted to this disodium salt by neutralizing with 2 N KOH (phenolphthalein endpoint). A solution of 66 g. of AgNO$_3$ in 130 ml. of water is added to the stirred solution and the precipitated silver salt is filtered off and dried in vacuo at 95°.

The disilver salt (93 g.) is stirred with 70 g. of Br$_2$ in 200 ml. of carbon tetrachloride at 0° for 1 hour and then refluxed for 1 hour. The precipitate is filtered off and extracted with chloroform for 36 hours in a Soxhlet extractor. The chloroform is evaporated in vacuo and the residue stirred with cold saturated aqueous NaHCO$_3$. The crude 1,4 - dibromotricyclo[4.3.1.1$^{4,8}$]undecane - 10,11-dione (V) is filtered off, dried, and recrystallized from ethyl acetate; M.P. 272–275°.

This dibromo diketone (17 g.) is refluxed for 1 hour with 12.9 g. of NaHCO$_3$ in 600 ml. of 50% aqueous ethanol and then cooled. The solution is extracted with chloroform, the chloroform extracts washed with saturated NaCl solution and dried. The solvent is concentrated to 500 ml., charcoal filtered, and then evaporated. The resulting 6 - bromo - 10 - oxotricyclo[4.3.1.0$^{4,8}$]decane-3-carboxylic acid (VI) is recrystallized from acetonitrile; M.P. 202–205°.

This bromo keto acid (9.5 g.) is vigorously stirred under reflux with 145 g. of zinc amalgam in 500 ml. of conc. HCl for 3 hours and then cooled. The aqueous phase is decanted off and diluted with a saturated aqueous NaCl solution, and the solution then extracted with ether. The ether extracts are washed, dried, and evaporated to give a residue which is triturated with ca. 75 ml. of hot acetonitrile. The insoluble material is discarded and the solution evaporated in vacuo. The residue is chromatographed with benzene on Florisil and the tricyclodecane-3-carboxylic acid (VII) obtained recrystallized from acetonitrile; M.P. 87–88°.

PROCEDURE 2

Tricyclo[4.3.0.0$^{3,8}$]nonane-6-carboxylic acid

6 - bromo - 10 - oxotricyclo[4.3.1.0$^{4,8}$]decane - 3 - carboxylic acid is converted to its silver salt and the silver salt is then refluxed with Br$_2$ in carbon tetrachloride by the same procedure and using the same relative quantities as used for the preparation of the 1,4-dibromo-10,11-dione above. The product is 3,6-dibromotricyclo[4.3.1.0$^{4,8}$]decane-10-one (VIII).

This dibromo ketone (3.08 g.) is refluxed for 3 hours with stirring with 1.68 g. of KOH in 50 ml. of 50% aqueous ethanol. The cooled solution is acidified with 3 N HCl and extracted with chloroform. The chloroform extracts are washed with saturated aqueous NaCl, dried, and evaporated to give 3-bromotricyclo[4.3.0.0$^{3,8}$]nonane-6-carboxylic acid (IX).

The bromo acid (2.45 g.) is refluxed for 2 hours with 0.35 g. of Li and 2.0 g. of t-butanol in 30 ml. of tetrahydrofuran. The mixture is cooled, filtered, adjusted to pH 4 with 3 N HCl, diluted with water, and extracted with ether. The ether extracts are washed with saturated aqueous NaCl, dried and evaporated to give the tricyclononane-6-carboxylic acid.

Since the compounds of the invention possess asymmetric carbon atoms, their preparation will result in the formation of both $d$ and $l$ forms. The invention is thus considered to encompass both the $d$ and $l$ forms and mixtures thereof.

I claim:
1. A compound of one of the following structures:

   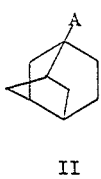

I    II wherein A is amino, aminomethyl, or α-aminoethyl, or a pharmaceutically acceptable acid addition salt thereof.

2. A compound according to claim 1 having structure I.
3. A compound according to claim 2, being the compound 3-aminotricyclo[4.3.1.0³,⁸]decane.
4. A compound according to claim 2, being the compound α - methyltricyclo[4.3.1.0³,⁸]decane - 3 - methylamine.
5. A compound according to claim 1 having structure II.
6. A compound according to claim 5, being the compound 6-aminotricyclo[4.3.0.0³,⁸]nonane.
7. A compound of one of the following structures:

   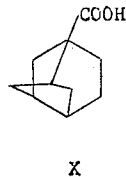

VII    X

8. A compound according to claim 7 having structure VII.

References Cited

UNITED STATES PATENTS 3,388,164   6/1968   Curran _____ 260—563

FOREIGN PATENTS 4,319   9/1966   France.

LORRAINE A. WEINBERGER, Primary Examiner

P. J. KILLOS, Assistant Examiner

U.S. Cl. X.R.

260—468, 563, 586; 424—325